United States Patent [19]

Tada

[11] Patent Number: 5,448,121

[45] Date of Patent: Sep. 5, 1995

[54] PNEUMATIC AND MAGNETIC BEARING TYPE MOTOR

[75] Inventor: Naoyuki Tada, Saitama, Japan

[73] Assignee: Fuji Xerox Co., Ltd., Tokyo, Japan

[21] Appl. No.: 135,996

[22] Filed: Oct. 14, 1993

[30] Foreign Application Priority Data

Nov. 30, 1992 [JP] Japan ................... 4-320305

[51] Int. Cl.⁶ .................................... H02K 7/09
[52] U.S. Cl. ...................... 310/90.5; 310/90; 384/115; 384/292
[58] Field of Search ............. 310/90.5, 90, 156, 179; 384/115, 292

[56] References Cited

U.S. PATENT DOCUMENTS

| 4,443,043 | 4/1984  | Yamaguchi ......... 310/90.5 UX |
| 4,523,800 | 6/1985  | Yamashita et al. ...... 310/90.5 UX |
| 4,726,640 | 2/1988  | Iwama et al. ............. 310/90.5 |
| 4,820,950 | 4/1989  | Hijiya et al. ............. 310/90.5 |
| 5,142,176 | 8/1992  | Takahashi ................ 310/90.5 |
| 5,172,021 | 12/1992 | Takahashi et al. ......... 310/90.5 |
| 5,223,758 | 7/1993  | Kataoka et al. ........... 310/90.5 |
| 5,273,368 | 12/1993 | Asada et al. .............. 384/115 |
| 5,289,067 | 2/1994  | Tanaka et al. ............ 310/90.5 |

FOREIGN PATENT DOCUMENTS

| 59-17023 | 1/1984 | Japan . |
| 63-70532 | 5/1988 | Japan . |
| 2217610  | 8/1990 | Japan ................ 384/115 |
| 0213712  | 9/1991 | Japan ................ 384/115 |

Primary Examiner—R. Skudy
Attorney, Agent, or Firm—Finnegan, Henderson, Farabow, Garrett & Dunner

[57] ABSTRACT

A pneumatic and magnetic bearing type motor provides a hollow rotary member fitted rotatably on a stationary shaft, radial pneumatic bearings having dynamic pressure generating grooves formed on one of the stationary shaft and hollow rotary member, supporting the hollow rotary member in a radial direction with the aid of dynamic pressures generated, and a thrust magnetic bearing supporting the hollow rotary member in a thrust direction thereof. In the motor, the position where the hollow rotary member is supported by the thrust magnetic bearing is substantially coincident with the equilibrium point where moments of the pressures are equal, whereby the motor is substantially free from vibration during operation, and the bearings are substantially prevented from being damaged when the motor is started or stopped.

4 Claims, 2 Drawing Sheets

PNEUMATIC AND MAGNETIC BEARING TYPE MOTOR

BACKGROUND OF THE INVENTION

The present invention relates to a pneumatic and magnetic bearing type motor in which a dynamic pressure pneumatic bearing is employed as a radial bearing, and a magnetic bearing as a thrust bearing.

An electric motor using pneumatic and magnetic bearings can be operated at much higher speeds than a motor using ball bearings or sliding bearings. Therefore, it is used in technical fields in which high speed rotation is essential. For instance, the motor is employed for the optical deflector of a laser printer, the magnetic cylinder of a video tape recorder (VTR), or a centrifugal separator.

FIG. 3 is a sectional view of an optical deflector for a laser printer which employs a conventional electric motor with pneumatic and magnetic bearings. The optical deflector has a stationary shaft 101, one end portion of which is fixedly secured to a base 103 by shrinkage fitting or press fitting. The base 103 is fixedly coupled to a lower casing 117 with screws 121. Herringbone-like dynamic pressure generating grooves 102 serving as radial bearings are formed on the cylindrical surface of the stationary shaft 101. The radial bearing is used as follows; When a force is applied to a rotary shaft at right angles, the radial bearing prevents the center of rotation from shifting from a predetermined position thereof.

The stationary shaft 101 is inserted into the rotor section of an electric motor with a small gap therebetween. In this case, the motor is to drive the optical deflector. The rotor section comprises: a rotary sleeve 104; and rotary magnets 109 and a balance ring 110 which are all fixedly mounted on the rotary sleeve 104 by press fitting or welding.

The rotary sleeve 104 forming the rotor section has a flange 106, the surface of which is perpendicular to the axis of the sleeve. A polygon mirror 105 is set on the surface of the flange 106, and the flange 107a of a cap 107 is placed on the polygon mirror 105. Under this condition, the polygon mirror 105 and the flange 107a are secured to the flange 106 with screws 108. An air pool 122 is formed between the upper end portion of the stationary shaft 101 and the inner surface of the cap 107.

The stator section of the electric motor comprises: the stationary shaft 101 one end portion of which is secured to the base 103 which is fixedly connected to the lower casing 117 with the screws 121; a stator core 112 secured to the lower casing 117 with screws 116; and stator coils 111 wound on the stator core 112.

A substrate 113 is secured to the stator core 112 with screws 115. A magnetic detecting element 114, which is preferably made up of a Hall element, is mounted on the substrate 113 thus secured. The magnetic detecting element 114 is adapted to detect the magnetic flux of each of the magnets 109 as the rotary sleeve turns.

The magnets 109 are permanent magnets, magnetically attracting the stator core 112. This magnetic attractive force prevents the magnet 109 and the stator core 112 from shifting in the direction of axis of the motor (or in the direction of thrust), that is, it acts to maintain the magnets 109 confronting with the stator core 112. This will be described in more detail. When the magnets 109 are moved upwardly, the magnetic attractive force produces a downward component to pull the rotary sleeve 104 downwardly; whereas when the magnets 109 are moved downwardly, the magnetic attractive force produces an upward component to pull the rotary sleeve 104 upwardly. Thus, the magnets 109 and the stator core 112 are held confronted with each other at a predetermined level by the magnetic attractive force. That is, the magnets 109 and the stator core 112 form a magnetic thrust bearing.

The magnetic detecting element 114 is made up of a Hall element for instance. When the magnets are turned, the magnetic detecting element 114 detects the leakage flux of each of the magnets 119, thereby to detect whether the N pole has passed or whether the S pole, and outputs a detection signal. The detection signal thus outputted is applied to a control circuit section (not shown) through a circuit printed on the substrate 113. In the control circuit section, the detection signal is utilized to determine the directions of currents applied to the stator coils 111, which are wound on the stator core 112. The interaction between the currents and the magnets 109 provides a force to maintain the rotation.

When, in the optical deflector of FIG. 3, the rotary sleeve 104 is turned, the dynamic pressure generating grooves 102 form air layers with high pressure around the stationary shaft 101. The air layers thus formed act to support the rotary sleeve 104 in such a manner that the latter 104 floats above the stationary shaft 101; that is, a so-called "dynamic pressure pneumatic bearing" is provided there. In the motor, the dynamic pressure generating grooves 102 are formed on the cylindrical surface of the stationary shaft 101; however, they may be formed on the inner cylindrical subrace of the rotary sleeve 104. The air layers act to maintain the center of rotation of the rotor section unchanged. For instance when the rotary sleeve 104 is shifted to the left in FIG. 3, then the gap on the right side is increased, and the pressure therein is therefore decreased; whereas the gap on the left side is decreased, and the pressure therein is therefore increased. Thus, the rotary sleeve is pushed to the right side by the difference between those pressures, and finally it is located at the original position.

An upper casing 118 is set on the lower casing 117. The side wall of the upper case 118 has an opening 119 which confronts with the polygon mirror 105. A window glass plate 120 is fitted in the opening 119.

The optical deflector thus constructed operates as follows: When a light beam outputted, for instance, by a laser (not shown) is applied through the window glass plate 120 of the opening 119 of the upper casing 118 to a mirror surface 151 of the polygon mirror 105, where it is reflected. The light beam thus reflected advances through the window glass plate 120 towards a photosensitive element. When the light beam emerges from the polygon mirror being reflected by the mirror surface 151, the direction of emergence of the light beam is gradually changed because the polygon mirror 105 is turned, so that the light beam scans the photo-sensitive element in the main scanning direction. When the polygon mirror is further turned, the light beam is reflected by the following mirror surface 151 in the same way. Thus, the light beam scans the photosensitive element over a predetermined angular range. The scanning speed depends on the speed of rotation of the polygon mirror 105.

An example of the above-described optical deflector has been disclosed, for instance, by Japanese Patent Application (OPI) No. 17023/1984 (the term "OPI" as used herein means an "unexamined application").

The specific feature of rotor supporting means in the optical deflector resides in that a journal pneumatic bearing (or radial bearing) provided inside a cylinder, and a thrust magnetic bearing provided outside the cylinder are so arranged that they are partially overlapped with each other in the axial direction. However, this arrangement is disadvantageous in the following points: That is, the unbalance of the thrust magnetic bearing, attributing to the manufacturing accuracy of the components or the assembling accuracy thereof, affects only one side of the journal bearing. As a result, vibrations are caused during rotation, and the bearings are greatly damaged when the rotation is started or stopped, so that the bearings are greatly shortened in service life.

In order to eliminate the above-described difficulties, Japanese Utility Model Application (OPI) No. 70532/1978 has disclosed a technique that magnetic bearings are provided at the upper and lower ends of a hollow rotary shaft.

However, the technique still suffers from the following problems:

(1) It needs at least four magnets which are expensive.

(2) In order to make the upper and lower magnetic bearings equal in performance, it is necessary to physically accurately position them. For this purpose, it is necessary machine the magnets, the hollow rotary shaft, and the stationary shaft with high accuracy.

(3) In order to unify the magnets in the, force of magnetization and in the pattern of magnetization, it is necessary to give 100% inspection to the magnets for flux density, or select magnets acceptable in flux density.

(3) It includes a number of components high in accuracy, and therefore assembling them takes a lot of time and labor.

SUMMARY OF THE INVENTION

In view of the foregoing, an object of the present invention is to provide a pneumatic and magnetic bearing type motor simple in construction in which, during rotation, vibration is lessened, and, when the motor is started or stopped, the bearings are substantially prevented from being damaged.

The foregoing object of the present invention has been achieved by the provision of a pneumatic and magnetic bearing type motor which, according to the present invention, provides a stationary shaft, a hollow rotary member fitted rotatably on the stationary shaft, radial pneumatic bearings having dynamic pressure generating grooves formed on one of the stationary shaft and hollow rotary member, the radial pneumatic bearings supporting the hollow rotary member in the radial direction thereof by using dynamic pressures generated, and a thrust magnetic bearing supporting the hollow rotary member in the thrust direction thereof. The position where the hollow rotary member is supported by the thrust magnetic bearing being substantially coincident with the equilibrium point where the moments of the pressures are equal.

In the motor, the effect of the thrust magnetic bearing in the radial direction acts uniformly on the radial pneumatic bearings.

In the motor, the drive device is further provided with magnets secured to the hollow rotary member, an annular core provided around the magnets, and a toroidal coil wound on the annular core. The core and magnets also serve as the thrust magnetic bearing.

Further in the motor, the position where the hollow rotary member is supported by the thrust magnetic bearing is substantially coincident with the position of the center of gravity of the hollow rotary member.

The nature, utility and principle of the present invention will be more clearly understood from the following detailed description and the appended claims when read in conjunction with the accompanying drawings.

DETAILED DESCRIPTION OF THE PREFERRED EMBODIMENTS

Preferred embodiments of the present invention will be described with reference to the accompanying drawings.

Figure 1:
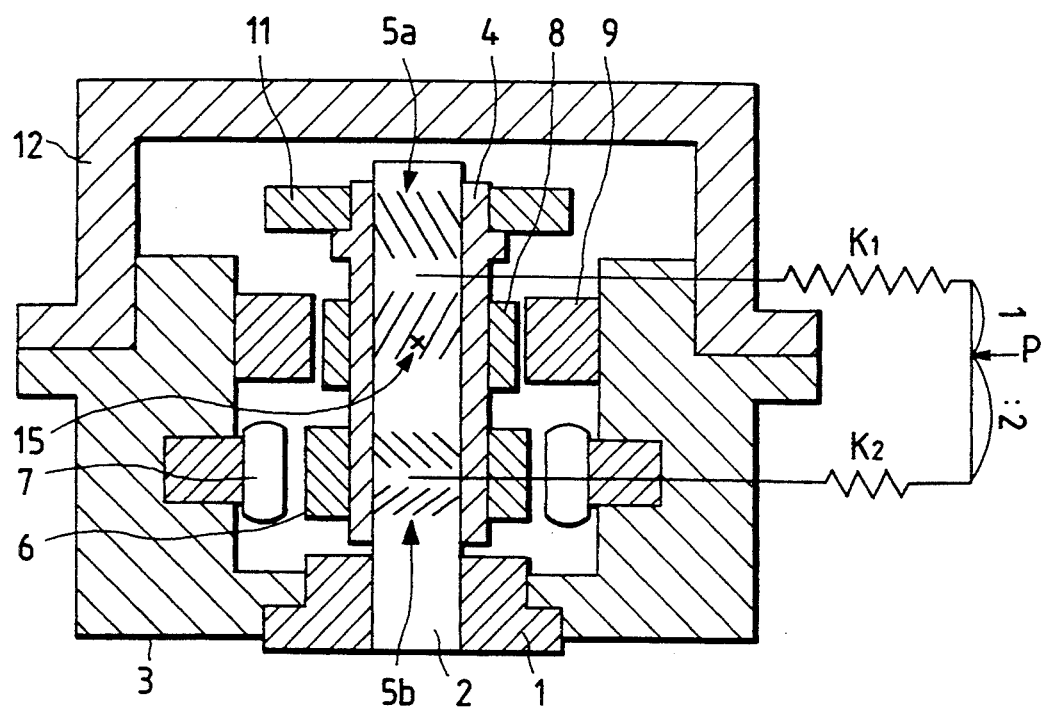
FIG. 1 is a sectional view of an optical deflector which employs a pneumatic and magnetic bearing type motor, which constitutes a first embodiment of the present invention.

A first embodiment of the present invention is a pneumatic and magnetic bearing type motor, which is applied to an optical deflector as shown in FIG. 1.

The motor shown in FIG. 1 is of the type that a thrust magnetic bearing is separated from the drive mechanism. The motor has a stationary shaft 2 press-fitted in a flange 1, which is secured to a housing 3. A hollow rotary member 4 like a tube is rotatably fitted on the stationary shaft 3 with a small gap therebetween. Two groups of herringbone-like dynamic pressure generating grooves 5a and 5b are formed on the upper and lower portions of the cylindrical surface of the stationary shaft, thus forming two radial pneumatic bearings with the inner cylindrical wall of the hollow rotary member 4.

The drive mechanism of the motor comprises: drive magnets 6 secured to the hollow rotary member 4; drive coils 7 mounted on the housing 3 in such a manner that they surround the drive magnets 6; a control board; and a magnetic detecting element (not shown). The magnetic detecting element is adapted to detect the leakage flux of each of the drive magnets 6, thereby to output a detection signal. The detection signal is applied to a control circuit section (not shown). In the control circuit section, the detection signal is utilized to determine the directions of currents in the drive coils 7. The interaction between the currents and the drive magnets 6 provides a force to maintain the rotation.

In the motor, a thrust magnetic bearing is formed by a ring-shaped magnet 8 which is fixedly mounted on the cylindrical surface of the hollow rotary member 4, and a magnet 9 which is secured to the housing 3 in such a manner that it surrounds the magnet 8. That is, the thrust magnetic bearing is formed by the magnet 8 on the magnetic bearing rotary side, and the magnet 9 on the magnetic bearing stationary side.

A rotary polygon mirror 11 forming an optical deflector is mounted on the hollow rotary member 4. The housing 3 is closed with a cover 12, the side wall of which has an opening (not shown) confronting with the polygon mirror 11. A window glass plate (not shown) is fitted in the opening. Instead of the polygon mirror 11, a scanning element such as a hologram disk may be employed which provides the equivalent effects.

In the embodiment, the radial pneumatic bearings supporting the hollow rotary member 4 generate pressures radially along the stationary shaft 2 in the small gap between the hollow rotary member 4 and the stationary shaft 3. The position of the hollow rotary member 4 supported by the thrust magnetic bearing (8 and 9) is coincident with the equilibrium point P where moments of the pressures are equal. In the embodiment, the rigidity $K_1$ of the radial pneumatic bearing formed by the upper group 5a of dynamic pressure generating grooves, and the rigidity $K_2$ of the radial pneumatic bearing formed by the lower group 5b of dynamic pressure generating grooves are so designed that the former is twice the latter. The equilibrium point P is positioned one-third ($\frac{1}{3}$) of the distance between the upper and lower radial pneumatic bearings below from the center of the upper radial pneumatic bearing.

Furthermore, in the embodiment, the center of gravity of the rotor comprising the hollow rotary member 4, the rotary polygon mirror 11, and the magnets 6 and 8 is coincident with the equilibrium point P.

In the embodiment, the effect of the thrust magnetic bearing in the radial direction acts equally on the two radial pneumatic bearings. Therefore, with the embodiment, the difficulties are substantially eliminated that, because of the unbalance, in radial direction, of a thrust magnetic bearing, vibration occurs during rotation, and the bearings are damaged when the motor is started or stopped. That is, with the motor, the bearings are improved in service life.

In the embodiment, a pair of magnets 8 and 9 form the thrust magnetic bearing, which means that the number of components necessary for formation of the trust magnetic bearing is reduced as much.

The center of gravity 15 of the rotor is located at the equilibrium point P, and therefore the center of the moment around the rotor is coincident with the center of the bearing. Therefore, the vibration during rotation, and the damage given to the bearing when the motor is started or stopped are lessened effectively. If the center of the moment around the rotor is not coincident with the center of the bearing, then forces perpendicular to the axis act around the center of the bearing, so that vibration occurs during operation, and the bearings are damaged when the motor is started or stopped.

Figure 2:
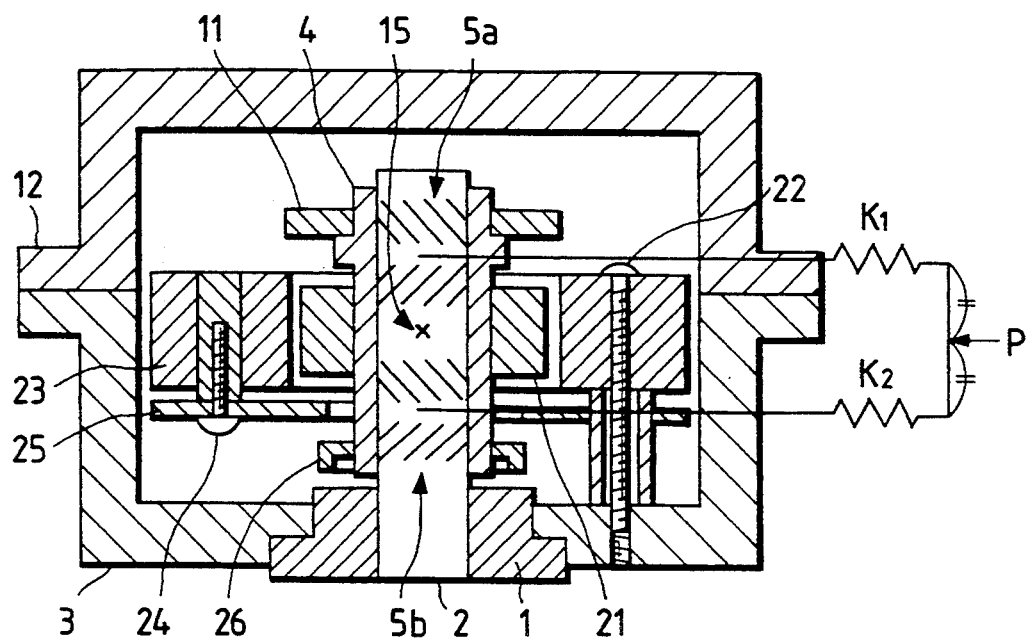
FIG. 2 is a sectional view of an optical deflector which employs one modification of the pneumatic and magnetic bearing type motor, which constitutes a second embodiment of the present invention.
Figure 3:
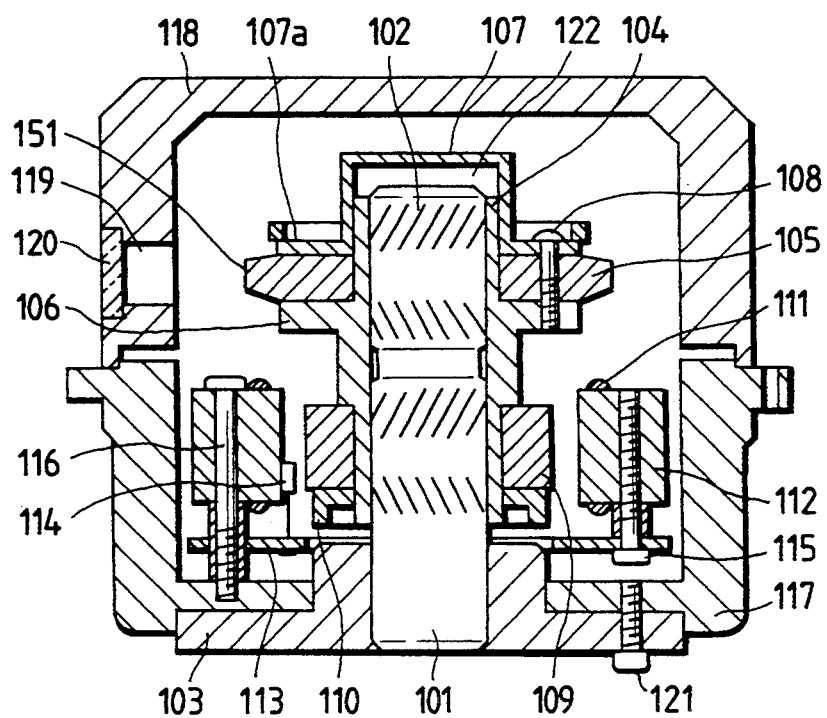
FIG. 3 is a sectional view of an optical deflector for a laser printer which employs a conventional pneumatic and magnetic bearing type motor.

A second embodiment of the present invention is a modification of the above-described pneumatic and magnetic bearing type motor, which is applied to an optical deflector as shown in FIG. 2, in which parts corresponding functionally to those which have been described with reference to FIG. 1 are therefore designated by the same reference numerals or characters.

In the second embodiment, drive magnets 21, which additionally serve as a magnet on the thrust magnetic bearing rotary side, is fixedly mounted on the cylindrical outer surface of a hollow rotary member 4. A drive core 23 is secured to a housing 3 with screws 22 in such a manner that it surrounds the drive magnets 21. A toroidal coil (not shown) is wound on the drive core 23. The drive core 23 additionally serves as magnet means on the thrust magnetic bearing stationary side.

A control substrate 25 is secured to the drive core 23 with screws 24. A magnetic detecting element is mounted on the control substrate 25.

A rotary polygon mirror 11 and a balance adjusting ring 26 are fixedly mounted on the outer cylindrical surface of the hollow rotary member 4.

In the second embodiment, too, two groups of herringbone-shaped dynamic pressure generating grooves 5a and 5b are formed on the cylindrical surface of a stationary shaft, thus providing upper and lower radial pneumatic bearings. The upper and lower radial pneumatic bearings are so designed that the bearings are equal in rigidity ($K_1 = K_2$). Hence, the equilibrium point P, where the moments of pressures generated radially along the stationary shaft 2 by the radial pneumatic bearings supporting the hollow rotary member 4 are equal, is located at the midpoint of the distance between both the radial pneumatic bearings. The equilibrium point P is coincident with the position where the hollow rotary member 4 is supported by the thrust magnetic bearing (21 and 23), and with the center of gravity 15 of the rotor which comprises the hollow rotary member 4, the rotary polygon mirror 11, the magnet 21, and the balance adjusting ring 26.

In the second embodiment, the drive magnets 21 and the drive core 23 serve as the thrust magnetic bearing, and therefore the number of components necessary for forming the thrust magnetic bearing can be further reduced when compared with the first embodiment.

The other structures, operations and effects of the second embodiment are substantially equal to those of the first embodiment.

While a few embodiments of the present invention have been illustrated and described in detail, it is particularly understood that the present invention is not limited thereto or thereby. For instance, the dynamic pressure generating grooves may be formed in the inner cylindrical surface of the hollow rotary member.

In addition, the motor of the present invention may be applied to other than the optical deflector. For instance, the motor of the present invention may be applied to video tape recorders (VTR) by replacing the rotary polygon mirror 11 with the cylinder head of the recorder.

As described above, with the motor of the present invention, the difficulties are substantially eliminated that, because of the unbalance, in radial direction, of a thrust magnetic bearing, vibration occurs during rotation, and the bearings are damaged when the motor is started or stopped. Thus, the bearings are improved in service life.

Furthermore, in the motor of the present invention, the drive core and the drive magnets form the thrust magnetic bearing. Therefore, the number of components necessary for forming the thrust magnetic bearing is further reduced.

In addition, in the motor of the present invention, the center of gravity of the hollow rotary member is located at the position where the thrust magnetic bearing supports the hollow rotary member. Therefore, when the motor is started or stopped, the vibration during rotation and the damage given to the bearing are lessened effectively.

While there has been described in connection with the preferred embodiments of the present invention, it will be obvious to those skilled in the art that various changes and modifications may be made therein without departing from the present invention, and it is aimed, therefore, to cover in the appended claims all such changes and modifications as fall within the true spirit and scope of the present invention.

What is claimed is:

1. A pneumatic and magnetic bearing type motor comprising:
   a stationary shaft;
   a hollow rotary member fitted rotatably on said stationary shaft;
   at least two radial pneumatic bearings having dynamic pressure generating grooves formed on one of said stationary shaft and hollow rotary member, said radial pneumatic bearings supporting said hollow rotary member in a radial direction thereof by generating dynamic pressures; and
   a thrust magnetic bearing supporting said hollow rotary member in a thrust direction thereof,
   wherein a position where said hollow rotary member is supported by said thrust magnetic bearing is substantially coincident with an equilibrium point where moments of said pressures are equal.

2. The pneumatic and magnetic bearing type motor of claim 1, wherein said thrust magnetic bearing comprises magnets secured to said hollow rotary member, and an annular core provided around said magnets and wound by a toroidal coil.

3. The pneumatic and magnetic bearing type motor of claim 1, wherein said position where said hollow rotary member is supported by said thrust magnetic bearing is substantially coincident with a position of a center of gravity of said hollow rotary member.

4. The pneumatic and magnetic bearing type motor of claim 1, further comprising a drive means for rotating said hollow rotary member, said drive means including drive magnets secured to said hollow rotary member, and drive coils mounted around said drive magnets.

* * * * *